United States Patent

[11] 3,544,048

| [72] | Inventors | Shuzo Oshima;<br>Eishyo Masuda; Iwao Sugiyama; Sueo<br>Akashi; Kiyoshi Sato, Hitachi-shi, Japan |
|---|---|---|
| [21] | Appl. No. | 705,416 |
| [22] | Filed | Feb. 14, 1968 |
| [45] | Patented | Dec. 1, 1970 |
| [73] | Assignee | Hitachi, Ltd.<br>Tokyo, Japan<br>a corporation of Japan |
| [32] | Priority | Feb. 17, 1967 |
| [33] | | Japan |
| [31] | | 12,727/42 |

[54] ELECTRIC MOTOR MOUNTING DEVICE
6 Claims, 3 Drawing Figs.

[52] U.S. Cl. ..................................................... 248/18;
267/1; 310/91
[51] Int. Cl. ........................................................ F16f 1/36
[50] Field of Search .......................................... 248/3, 6, 8,
9, 10, 15, 18, 22, 24, 358; 180/64; 267/1FR;
310/91, 51

[56] References Cited
UNITED STATES PATENTS

| 2,058,693 | 10/1936 | Hutter | 248/18 |
|---|---|---|---|
| 2,144,848 | 1/1939 | Miller | 248/10X |
| 2,196,428 | 4/1940 | Saurer | 248/9 |
| 2,711,297 | 6/1955 | Thiele | 248/18 |

Primary Examiner—Roy D. Frazier
Assistant Examiner—J. Franklin Foss
Attorney—Craig, Antonelli, Stewart & Hill ABSTRACT: An electric motor mounting device comprising a mounting arm fixed to the electric motor and two vibration damping members of different spring constants, of which the one having a larger spring constant is disposed on that side of the mounting arm which faces a baseplate to which said electric motor is to be mounted and another one having a smaller spring constant is disposed on the opposite side of the mounting arm, both of said vibration damping members and said mounting arm being tightened together with the baseplate by means of a bolt and a nut.

Patented Dec. 1, 1970  3,544,048

INVENTORS
SHUZO OSHIMA, EISHYO MASUDA,
INAO SUGIYAMA, SUEO AKASHI,
KIYOSHI SATO

BY Craig & Antonelli

ATTORNEYS

ELECTRIC MOTOR MOUNTING DEVICE

BACKGROUND OF THE INVENTION

The present invention relates to an electric motor mounting device which is most adapted to damp or absorb the vibration, for example, of a sewing machine operating clutch motor, especially for industrial use.

In the past, a clutch motor used for operating a sewing machine has generally been mounted on a table or the like through the intermediary of a simple rubber used as a vibration damping or absorbing element. In such arrangement, the vibration generated by the motor propagates to the table, causing a vibration of said table and producing a considerably annoying noise which has been found to be a magnitude of from 46 to about 55 horns.

SUMMARY OF THE INVENTION

The present invention relates to an improvement of a mounting device of the type described. Namely, the object of the present invention is to minimize the vibration of a baseplate, such as a table, on which said motor is mounted, and thereby drastically reduce the resultant noise, by determining characteristics of vibration damping means which is to be provided operably between the mounting arm of the motor and the baseplate.

BRIEF DESCRIPTION OF THE DRAWINGS

The present invention will be described in detail hereunder with reference to the accompanying drawings which illustrate an embodiment of the invention and in which.

DESCRIPTION OF THE PREFERRED EMBODIMENTS

Figure 1:
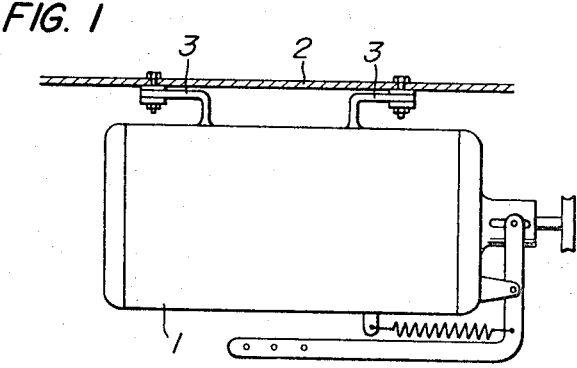
FIG. 1 is a schematic front elevation of the mounting device according to the present invention, which is used for the mounting of a clutch motor.
Figure 2:
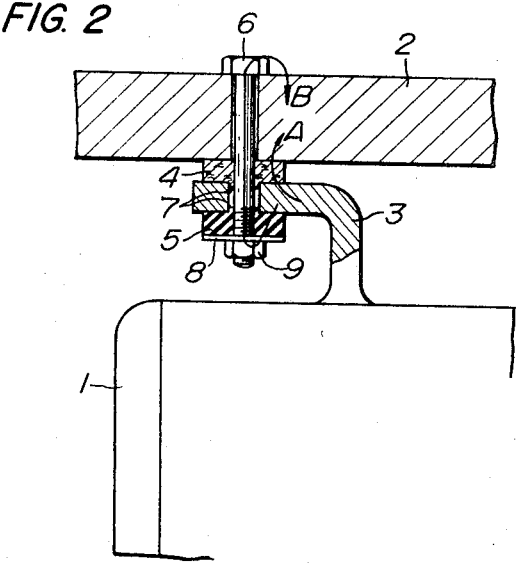
FIG. 2 is a fragmentary vertical cross section, in enlargement, of the mounting device of this invention.

Referring to FIGS. 1 and 2, there is shown a clutch motor 1 mounted on the underside of a baseplate 2 such as a table. Namely, the clutch motor 1 is mounted on the baseplate 2 by way of mounting arms 3 which are secured to said motor. The mounting arms 3 are respectively connected to the baseplate 2 through the intermediary of vibration damping members in such a manner as will be described hereunder. Between the baseplate 2 and the mounting arm 3 is interposed a first vibration damping member 4 consisting of elastic material such as cork, rubber and felt, while on the opposite side of the mounting arm 3, that is the side remote from the baseplate 2, is provided a second vibration damping member 5 of elastic material whose spring constant is smaller than that of said first vibration damping member 4. The vibration damping members 4 and 5 and the mounting arm 3 are tightened together with the baseplate 2 by means of a supporting steel plate 8, a nut 9, and a tightening bolt 6 in a manner as best shown in FIG. 2, in which the mounting arm 3 is provided with a hole of which diameter is larger than that of the tightening bolt 6 so that the mounting arm 3 may not touch with the tightening bolt 6 during vibration. As shown in the drawing, each vibration damping member has preferably a flange portion 7 which is to be fitted in the hole of the mounting arm 3. If desired, the flange portion of one of the vibration damping means may extend so as to reach the other vibration damping means.

Figure 3:
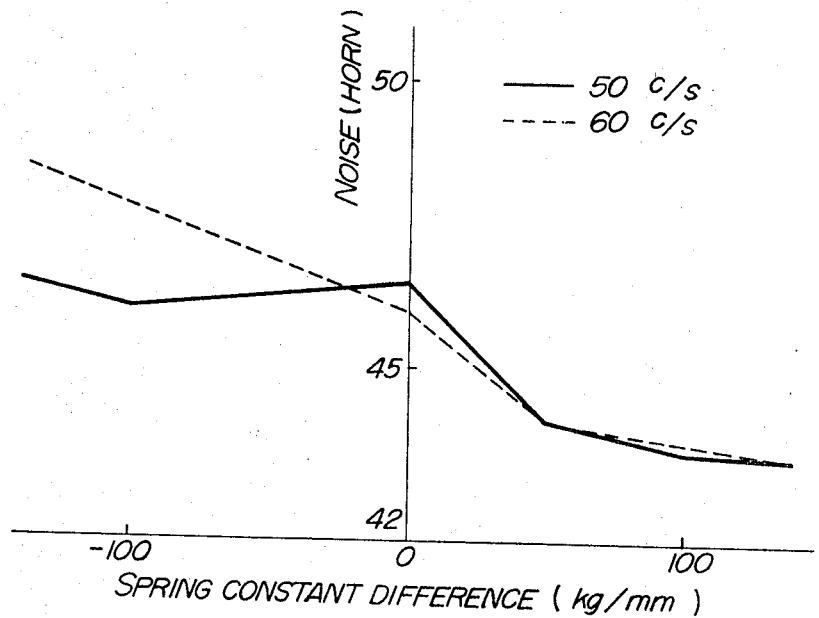
FIG. 3 shows noise characteristics of a mounting device, plotted against the spring constant difference between the vibration damping members used therein.

With the clutch motor mounted in the manner described above, the present inventors have measured the noise for various spring constant differences between the vibration damping members 4 and 5, the result of which is shown in the chart of FIG. 3. From the result, it has been found that the noise is large when the spring constant of the first vibration damping member is smaller than that of the second vibration damping member, but when the former is larger than the latter, the noise decreases rapidly as the difference therebetween becomes greater. It has also been found that such tendency lasts until the spring constant difference reaches 45 kg./mm., but the rate of noise decrease is not so high as before when the difference exceeds 45 kg./mm. In order to minimize the vibration and noise, therefore, it is preferable for the spring constant difference between the damping members 4 and 5 to be greater than 45 kg./mm. For instance, when a material having a spring constant of 75 kg./mm., was used for the vibration damping member 4 which is disposed on the baseplate side of the mounting arm, and a material having a spring constant of 30 kg./mm., was used for the vibration damping member 5 on the opposite side of said mounting arm, so as to produce a spring constant difference of 45 kg./mm., the noise generated was of a magnitude of about 44 horns. It was found that changes of a few horns in this magnitude of the noise had a drastic influence on operator's ears. When the noise is a magnitude of 47 horns, most of operators were annoyed very much. On the contrary, when the noise was reduced to 44 horns, operators were no more annoyed.

The experiment was conducted for a sewing machine in which 200 watt single 4 poles clutch motor was mounted on a table composed of plywood of 40 mm. thickness and the magnitude of the generated noise was measured at a distance of about 50 cm., above the table. In this embodiment, the vibration damping members 4 and 5 are composed of rubber materials having different spring constants. Since the spring constant $K_c$ of a cylindrical elastic material can be determined by the following formula, in which $K_c$ is compression spring constant, E is a Young's modulus, A is a sectional area, and h is a thickness or a height;

$$K_c a E(A/h)$$

Difference in the spring constant between damping members 4 and 5 may be adjusted to a proper amount by choosing either E, A or h. In another embodiment, the damping member 4 is made of cork and the damping member 5 is made of rubber. This decrease in the noise is assumably due to the following reason. The vibration from the electric motor 1, propagates to the baseplate 2, partially through a route A, i.e. through the mounting arm 3 and the vibration damping member 4, and partially through a route B, i.e. through the mounting arm 3, the vibration damping member 5 and the tightening bolt 6. These two components of the vibration, propagating through the routes A and B, respectively, may have different phases and amplitudes as a result of the difference in the spring constants of the vibration damping members 4 and 5, and counteract on each other, whereby the vibration propagating to the baseplate 2 is decreased.

In the embodiment described above, the electric motor is mounted on the underside of the baseplate 2, but it was found by experiments that similar noise reducing effect of the mounting device according to the invention can also be obtained when the electric motor is mounted on the upper side of the baseplate 2. In other words, the location of the motor has no influence on the effect of the mounting device according to the invention.

According to the present invention, since the electric motor is mounted on the baseplate through the intermediary of the vibration damping members whose damping characteristics are properly selected in the manner described and which are arranged rationally as described above, the vibration from the motor propagating to the baseplate can be damped or absorbed substantially and thereby the noise can be suppressed to a level which is lower by far than that generated with the conventional device.

We claim:

1. A mounting device for an electric motor of a sewing machine comprising a mounting arm fixed to the electric motor of the sewing machine and adapted to mount said electric motor of the sewing machine on a sewing machine table, a first vibration damping member interposed between said mounting arm and said sewing machine table, a second vibration damping member provided on a side opposite to said first vibration damping member with respect to the mounting arm and a tightening member for closely contacting said respective vibration damping members with said mounting arm and tightening said first and second vibration damping members and said mounting arm with said sewing machine table, the spring constant of said first vibration damping member being greater than that of said second vibration damping member.

2. A mounting device for an electric motor of a sewing machine according to claim 1, wherein the spring constant of said first vibration damping member being at least 45 kg./mm., greater than that of said second vibration damping member.

3. A mounting device for an electric motor of a sewing machine according to claim 1, wherein said first vibration damping member is made of cork which has a relatively large spring constant and said second vibration damping member is made of rubber which has a relatively small spring constant.

4. A mounting device for an electric motor of a sewing machine according to claim 1, in which the first and second vibration damping members and the mounting are respectively provided with holes therethrough and the tightening member comprises a nut and a bolt which has a smaller diameter than that of the hole in the mounting arm so as to pass through the hole with an annular clearance maintained therebetween.

5. A mounting device for an electric motor of a sewing machine according to claim 2, wherein both the first and second vibration damping members are made of rubber materials of different Young's moduli.

6. In a sewing machine having a table, a clutch motor, and mounting means for mounting said clutch motor on the table, the improvement being characterized in that said mounting means comprises a mounting member connected to said clutch motor, first and second elastic means being provided on both sides of the mounting member, and tightening means for tightening the first and second elastic means with the table in a manner that the mounting member is supported by the first and second elastic means with said first elastic member being interposed between the mounting member and the table, wherein the spring constant of the first elastic means is greater than that of the second elastic means.